May 3, 1949.　　　　G. D. ROWLAND ET AL　　　　2,469,244
INDEPENDENT FRONT WHEEL SUSPENSION

Filed June 10, 1946　　　　　　　　　　　　　　2 Sheets-Sheet 1

GEORGE D. ROWLAND
HAROLD J. MORRIS
INVENTORS

BY
C. C. McRae
R. D. Harris
J. R. Faulkner
T. H. Oster
ATTORNEYS

May 3, 1949.　　　G. D. ROWLAND ET AL　　　2,469,244
INDEPENDENT FRONT WHEEL SUSPENSION

Filed June 10, 1946　　　　　　　　　　2 Sheets-Sheet 2

GEORGE D. ROWLAND
HAROLD J. MORRIS
*INVENTORS*

BY
ATTORNEYS.

Patented May 3, 1949

2,469,244

UNITED STATES PATENT OFFICE 2,469,244

INDEPENDENT FRONT WHEEL SUSPENSION

George D. Rowland, Dearborn, and Harold J. Morris, Wayne, Mich., assignors to Ford Motor Company, Dearborn, Mich., a corporation of Delaware Application June 10, 1946, Serial No. 675,513

4 Claims. (Cl. 280—124)

This invention relates generally to wheel suspensions and more particularly to independent wheel suspensions for motor vehicles.

One of the objects of the present invention is to provide an independent wheel suspension for a motor vehicle in which improved ride characteristics are obtained, together with increased stability during operation.

Another object of the invention is to provide an independent wheel suspension in which a large number of conventionally used parts are eliminated, such as axles, leaf or coil springs, radius rods, sway bars, stabilizers and the like, and are replaced by a simplified construction which is both economical to manufacture and easy to maintain in proper working condition.

A further object is to provide a wheel suspension in which the various stresses are so distributed that a minimum stress is placed upon any one part. This is accomplished by providing thrust arms which carry the majority of the thrust loads in longitudinal and transverse directions only, and a plurality of springs, such as torsion bars, between which the suspension load or weight of the vehicle is distributed.

Still another object is to provide an independent suspension adapted for use both with front and rear wheels of a motor vehicle; and which is particularly advantageous when used with front wheels since it enables the camber, caster and toe-in of the front wheels to be maintained constant during deflection of the springs. In addition, the suspension is adapted for use with a steering geometry which will not be effected by permanent or operational deflection of the front suspension or by unequal deflection between the two front wheels.

Other objects and advantages of the invention will be made more apparent as this description proceeds, particularly when considered in connection with the accompanying drawings, in which.

Figure 1:
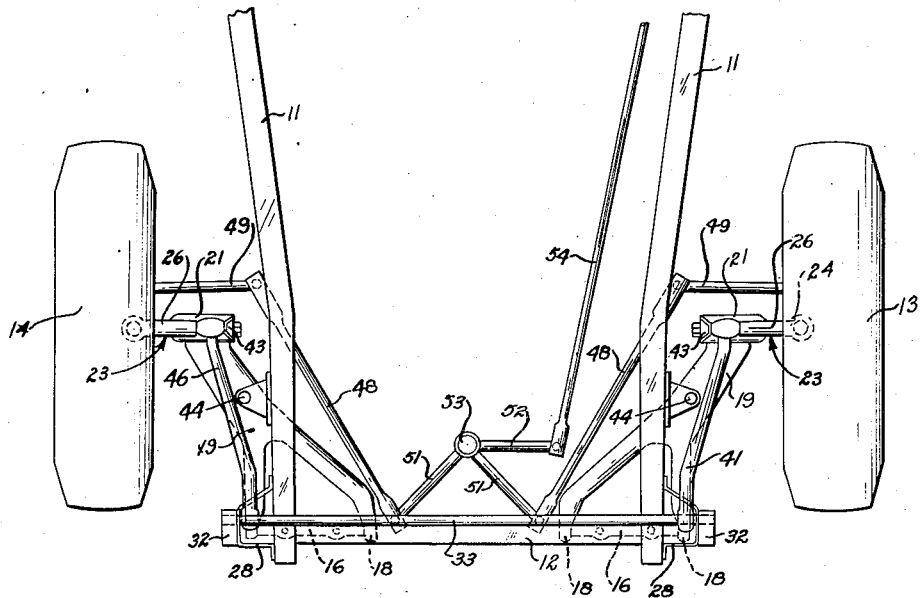
Figure 1 is a plan view of the front portion of an automobile chassis provided with the wheel suspension of the present invention.

Referring now more particularly to the drawings, there is shown a vehicle frame having side frame members 11 and a transverse front cross frame member 12. Steerable front wheels 13 and 14 are arranged on opposite sides of the frame. Short axles 16 are bolted to the underside of the front cross frame member 12 and the side frame members 11 adjacent opposite sides of the frame. The forwardly extending furcations 18 of bifurcated thrust arms 19 are pivotally mounted upon the axles 16.

Each arm 19 extends rearwardly from the axle 16 and carries at its rearward end a sleeve 21, which is either integrally formed therewith or separately formed and suitably secured thereto. The axes of the sleeves 21 extend transversely of the vehicle, and rotatably support stub axles 22 which extend inwardly from the wheel carriers 23. The wheel carriers are provided with knuckles 24 upon which the front wheels 13 and 14 are conventionally mounted for pivotal movement to steer the vehicle. The wheel carriers 23 are also formed with upwardly and downwardly extending arms 26 and 27 respectively.

From the foregoing it will be apparent that the thrust arms 19 rotatably support the front wheels and provide for swinging movement of the wheels about a transversely extending axis located some distance ahead of the center of the wheels. The arms are sufficiently rigid to carry the thrust loads upon the wheels both in the longitudinal and transverse directions, and additional stability is provided by the spacing apart in a transverse direction of the furcations 18 of each thrust arm to assist in resisting transverse thrust loads upon the wheels. Inasmuch as the wheels are constrained to move through predetermined planes, there can be no change in the camber or toe-in of the wheels during vertical movement relative to the frame. In addition, the tread likewise remains constant.

A bracket 28 is welded or bolted to the outboard side or each of the side frame members 11 adjacent the ends of the front cross frame member 12. Each of these brackets carriers an outwardly extending upper bracket 29 and an outwardly extending lower bracket 31, each of which supports a bearing block 32.

Figure 2:
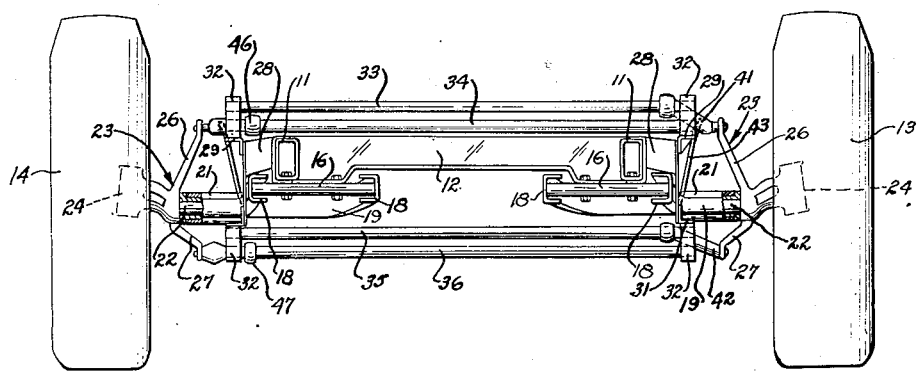
Figure 2 is a front elevation of the construction shown in Figure 1.
Figure 3:
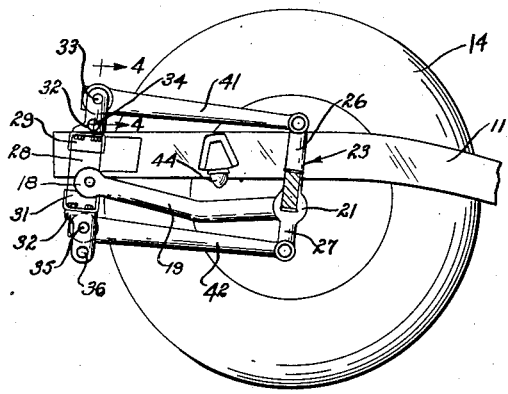
Figure 3 is a side elevation thereof, with one front wheel omitted and the wheel carrier in section.
Figure 4:
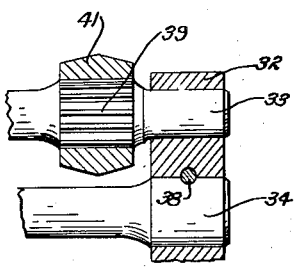
Figure 4 is an enlarged fragmentary cross section taken substantially on the plane indicated by the line 4—4 of Figure 3.

A pair of torsion bars 33 and 34 extend transversely across the vehicle between the upper bearing blocks 32, and a second pair of torsion bars 35 and 36 likewise extend transversely of the vehicle between the lower bearing blocks. Each of the torsion bars has one end anchored to one of the bearing blocks and its opposite end journaled in a bearing block at the opposite side of the frame. For example, torsion bars 33 and 35 are anchored in the upper and lower bearing blocks respectively at the left side of the frame as seen in Figures 1 and 2, the anchoring means comprising a key 38 as shown, or other suitable anchoring means such as splines or the like. The opposite ends of the torsion bars 33 and 35 are journaled in the bearing blocks at the right side of the frame as seen in Figures 1 and 2, and are formed with splines 39 adjacent the journaled ends. Upper and lower suspension arms 41 and 42 are mounted at their forward ends upon the splines 39 formed on the torsion bars 33 and 35 respectively, and extend rearwardly and substantially in parallel relationship with each other and with the thrust arm 19. At their rearward ends the suspension arms 41 and 42 are pivotally mounted to the ends of the upper and lower arms 26 and 27 respectively of the wheel carrier 23. Additional stability is afforded the construction by means of a brace 43 extending between the pivotal connections at the rearward ends of the upper arms 41 and the inboard ends of the stub axles 22 of the wheel carriers. Resilient bumpers 44 of conventional design are mounted upon the side frame members 11 to limit the swinging movement of the suspension linkage by engagement with the thrust arms 19.

From the foregoing description it will be apparent that the torsion bars 33 and 35 and the suspension arms 41 and 42 function to resiliently suspend the wheel carrier 23 and the front wheel 13 from the frame of the vehicle. Inasmuch as the major portion of the longitudinal and transverse thrust loads are taken by the thrust arm 19, the suspension arms 41 and 42 need only carry the vertical load, and since the vertical suspension load is divided between the arms 41 and 42 and the torsion bars 33 and 35 it will be apparent that the stress is distributed between a number of parts so that the total stress upon any one part is minimized. A resulting improved safety factor and more economical construction results. Furthermore, since the suspension arms 41 and 42 and the thrust arm 19 form a multiple parallelogram linkage system, the caster angle of the wheel remains unchanged during deflection of the latter.

The construction and arrangement of the torsion bars 34 and 36 and their corresponding suspension arms is similar to that described above, except that the torsion bars are reversed. Adjacent ends of the torsion bars 34 and 36 are anchored in the upper and lower bearing blocks 32 at one side of the frame while the opposite ends of the bars are journaled in the bearing blocks at the other side of the frame. Adjacent the journaled ends of the torsion bars 34 and 36, upper and lower suspension arms 46 and 47 are mounted upon the bars by means of splines, and extend rearwardly, being pivotally connected at their rearward ends to the wheel carrier 23 for the front wheel 14. Although the torsion bars for the suspensions for the front wheels 13 and 14 are thus mounted upon the same bearing blocks, it will be seen that they operate independently so that each front wheel is suspended independently of the other front wheel. The plurality of torsion bars combine to provide improved ride characteristics for the vehicle.

Although various types of steering arrangements may be used with the present suspension, the type shown in Figure 1 is particularly suitable since it provides a steering geometry which is not effected either by permanent sag of the front suspension, deflection of the front wheels during operation, or unequal deflection between the two front wheels. This is accomplished by arranging the tie rods 48 of the steering linkage so that their forward ends are substantially in vertical alignment with the transversely extending torsion bars. The tie rods 48 are universally connected at their rear ends to conventional knuckle arms 49 to steer the wheels, and at their forward ends to links 51. The links 51 are joined to each other and to a drag link arm 52, and the assembly is pivotally mounted upon the frame at a point 53 on the longitudinal centerline of the vehicle. The drag link arm 52 is connected by a drag link 54 to a conventional steering gear (not shown). It will be noted that the steering linkage is symmetrical with respect to the longitudinal centerline of the vehicle, and that the pivotal connections between the links 51 and the tie rods 48 are substantially in alignment with the torsion bars so that balanced steering is effected.

Figure 5:
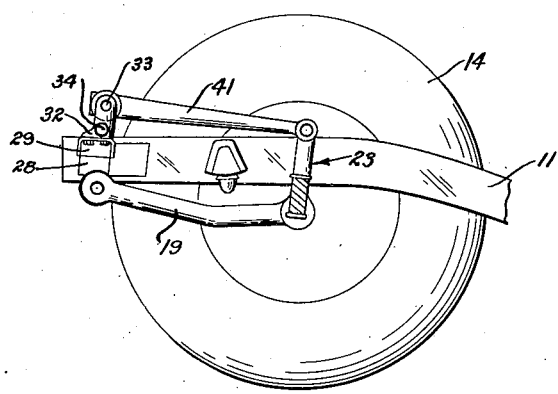
Figure 5 is a side elevation similar to Figure 3 but illustrating a modification.

Reference is now made to Figure 5 which illustrates a modification of the invention which is generally the same as the construction shown in Figures 1 to 4 inclusive except that the lower suspension arms 42 and 47, together with their torsion bars 35 and 36, are omitted. With this arrangement the upper suspension arms 41 and 46 cooperate with the thrust arms 19 and the wheel carrier 23 to form a parallelogram type of linkage. This arrangement has the advantage of more economical cost of manufacture and simplicity of design but requires somewhat heavier torsion bars since the deflection load upon each wheel is taken by the single torsion bar.

It will be understood that the invention is not to be limited to the exact construction shown and described, but that various changes and modifications may be made without departing from the spirit and scope of the invention, as defined in the appended claims.

What is claimed is:

1. In a wheel suspension for a vehicle having a frame and a road wheel, a relatively heavy thrust arm of generally wishbone shape having its forward end bifurcated and pivotally mounted directly upon said frame at relatively widely spaced points for pivotal movement about a generally transversely extending axis, a wheel carrier pivotally connected to the rearward end of said thrust arm and supporting said road wheel, a pair of vertically spaced transversely extending torsion bars each anchored to said frame at the side of the latter remote from said road wheel, one of said torsion bars being above said thrust arm and the other of said torsion bars being below said thrust arm, and a pair of generally parallel longitudinally extending suspension arms each connected at its forward end to one of said torsion bars and pivotally connected at its rearward end to said wheel carrier so that said torsion bars and suspension arms resiliently suspend said road wheel and said heavy thrust arm takes substantially the entire longitudinal and transverse thrust of said road wheel.

2. In a front wheel suspension for a vehicle having a frame provided with a front cross member and a pair of steerable road wheels on opposite sides of said frame, in combination, short transversely extending axles rigidly supported adjacent the lower side of said cross member, thrust arms pivotally connected to said axles and extending rearwardly therefrom, sleeves formed at the rearward ends of said thrust arms, wheel carriers supporting said road wheels and having portions rotatably mounted in said sleeves, brackets carried by said frame adjacent opposite ends of said cross member, two pairs of transversely extending torsion bars extending between said brackets with one pair being above said cross member and the other pair being below said cross member, one end of one of the torsion bars of each pair being anchored to the bracket at one side of said frame and one end of the other torsion bar of each pair being anchored to the bracket at the opposite side of said frame, a suspension arm connected to the unanchored end of each of said torsion bars, said suspension arms extending rearwardly from said torsion bars and pivotally connected at their rearward ends to said wheel carriers at points above and below the pivotal connections between said thrust arms and said wheel carriers.

3. In a wheel suspension for a vehicle having a frame and a road wheel, a wheel carrier supporting said wheel, a pair of vertically spaced parallel arms extending longitudinally of said vehicle and pivotally connected at their rear ends to said wheel carrier, the forward end of said suspension arms being mounted upon said frame for pivotal movement about transversely extending axes, spring means associated with said suspension arms for resiliently suspending said road wheel, and a heavy rigid one-piece thrust arm intermediate said upper and lower suspension arms, said thrust arm being pivotally connected at its forward end directly to said frame at widely spaced transversely aligned points and at its rearward end being pivoted directly to said wheel carrier about a transverse axis substantially in alignment with the point of connection of said wheel carrier to said road wheel.

4. In a wheel suspension for a vehicle having a frame and a road wheel, a thrust arm of generally wishbone shape mounted upon said frame for pivotal movement about a generally transversely extending axis, a wheel carrier pivotally connected to the rearward end of said thrust arm and supporting said road wheel, a pair of vertically spaced transversely extending torsion bars each anchored to said frame at the side of the latter remote from said road wheel, one of said torsion bars above said thrust arm and the other of said torsion bars being below said thrust arm, a pair of generally parallel longitudinally extending suspension arms each connected at its forward end to one of said torsion bars and pivotally connected at its rearward end to said wheel carrier so that said torsion bars and suspension arms resiliently suspend said road wheel and said thrust arm takes the longitudinal and transverse thrust of said road wheel, said thrust arm carrying a transversely extending sleeve at its rearward end and said wheel carrier having an axial portion rotatably supported in said sleeve, and a brace interconnecting the inner end of said axle and the rearward ends of said suspension arms.

GEORGE D. ROWLAND.
HAROLD J. MORRIS.

REFERENCES CITED

The following references are of record in the file of this patent:

UNITED STATES PATENTS

| Number | Name | Date |
| --- | --- | --- |
| 2,033,493 | Straussler | Mar. 10, 1936 |
| 2,045,210 | Wagner | June 23, 1936 |
| 2,090,141 | Newton | Aug. 17, 1937 |
| 2,164,470 | Opolo | July 4, 1939 |
| 2,166,774 | Tjaarda | July 18, 1939 |
| 2,371,864 | Woolson | Mar. 20, 1945 |